Patented July 9, 1940

2,207,076

UNITED STATES PATENT OFFICE 2,207,076

METHOD FOR THE PURIFICATION OF CELLULOSE ETHERS

Harold M. Spurlin, Wilmington, Del., assignor to Hercules Powder Company, Wilmington, Del., a corporation of Delaware No Drawing. Application November 30, 1938, Serial No. 243,121

9 Claims. (Cl. 260—232)

This invention relates to a method for the purification of ethyl cellulose insoluble in water but soluble in organic solvents and more particularly to a method for the purification of crude ethyl cellulose to free it from the impurities usual in the crude reaction product mixture.

In the preparation of ethyl cellulose, there is usually obtained a reaction product mixture consisting of ethyl cellulose dissolved in organic solvents, a salt, any excess alkali, a variable quantity of water, unreacted and partially reacted cellulose, and impurities introduced by equipment and raw materials. The organic solvent mixture, which consists of any excess etherification agent, side reaction products such as ether and alcohol, and any solvent which has been added to facilitate the reaction, is usually substantially immiscible with water. The water present dissolves the alkali and the salt, but is commonly not in sufficient quantity to dissolve all of these materials.

The ethyl cellulose is recovered from the reaction product mixture by precipitation or by distillation of the solvent from the ethyl cellulose. Then follows a long series of aqueous washes to remove the salt, alkali and other water soluble impurities. Sometimes, even twenty or thirty washes fail to remove completely the salt and alkali from dense lumps or grains. Prolonged washing is expensive because of the water, labor and equipment it requires.

Aqueous washes will not free the precipitated ethyl cellulose of unreacted and partly reacted cellulose or of certain other haze producing impurities. To remove such impurities it has been usual to filter solutions of the cellulose ether. This operation is costly since such viscous colloidal solutions filter slowly unless so dilute that a great deal of solvent is used, and since the haze forming impurities tend to clog filter media.

This invention has for its object the removal of water soluble impurities, especially salts and alkali, from the crude ethyl cellulose reaction product by a simple and inexpensive method.

A further object is to prevent obstruction of precipitating apparatus by crystals of a salt in the reaction product.

A still further object is the removal of partially reacted and unreacted cellulose and other haze forming impurities from a crude ethyl cellulose by a simple and inexpensive method.

These objects are accomplished by this invention, in accordance with which a water-immiscible solution of a crude ethyl cellulose is brought into intimate contact with water and the ethyl cellulose solution is then separated from the resulting aqueous phase. The separation may be brought about by settling and decantation or by such accelerated means as centrifuging. The ethyl cellulose may then be recovered by being precipitated, washed free of residual water-soluble impurities, and dried.

By a water-immiscible solution is herein meant one which, when mixed with water, can be separated into two liquid phases with no precipitation of the ethyl cellulose. The substantially water-immiscible solvent used for such a solution may be such as, for example, benzene, toluene, carbon tetrachloride, a mixture of benzene and alcohol, a mixture of benzene, ethyl ether, and ethyl alcohol, a mixture of ethyl chloride, ethyl ether, and ethyl alcohol, similar mixtures containing dioxan or volatile petroleum hydrocarbons and so forth, provided that any water-miscible component will not be present in large enough proportion to cause the solvent mixture to be substantially water-miscible. In the absence of free caustic, ketone and ester solvents may be utilized. The particular solvent utilized will usually depend on the particular preparation process which is to be followed by the application of this invention.

The crude ethyl cellulose which may be purified in accordance with this invention is one insoluble in water but soluble in organic solvents. It may, for example, be an ethyl cellulose with an ethoxy content in the range from about 38% to about 54%.

In carrying out this invention on, for example, a crude ethyl cellulose in its reaction product mixture, the solution of the ethyl cellulose in the solvents present will often not be sufficiently mobile to flow readily or be agitated easily. In this case, solvents may be added and mixed in, choosing a solvent which will give a final solvent mixture from which the ethyl cellulose is not precipitated by water. It may conveniently be a solvent present during the reaction. Preferably, sufficient solvent is added to reduce the viscosity of the ethyl cellulose solution to less than about 5 poises, although the viscosity may be left as high as about 100 poises. To the crude ethyl cellulose solution, which may or may not have been thinned by solvent, water is added and mixed in, desirably with agitation to produce a large surface between the water and the ethyl cellulose phases. The water preferably is in excess over that required for solution of the water soluble impurities. Between about $\frac{1}{10}$ and about 10 volumes, preferably between about $\frac{1}{2}$ and about 1 volume of water per volume of ethyl cellulose solution, including water added and water already present, may be used. The aqueous and ethyl cellulose phases are now allowed to stand until the two stages separate, which will usually occur within about ¼ to 24 hours or preferably the two phases are rapidly separated by centrifuging. Continuous centrifuging equipment, which is well known and available, is advantageously utilized since it fits in well with subsequent continuous precipitation. The ethyl cellulose may now be recovered by any suitable means, washed to remove residual impurities, and dried. The result is a product of superior color, clarity, and freedom from fibres in solution, achievable otherwise only by very long washing and an additional clarification step, such as filtration.

Since this invention is applicable to a wide variety of water-immiscible ethyl cellulose solutions, it may sometimes be found that separation of the hereinbefore mentioned aqueous phase from the ethyl cellulose phase is difficult because of the formation of stable emulsions. This tends to occur when a very large quantity of water is used relative to the salt and alkali present. Under such conditions, it is desirable to add a water-soluble salt such as, for example, sodium chloride, sodium sulphate, potassium chloride, sodium carbonate, sodium bicarbonate, and the like, in sufficient quantity to break or prevent the formation of a stable emulsion. Preferably, a salt relatively insoluble in organic solvents, for example, sodium sulphate or sodium carbonate, is utilized. The water-soluble salt may be added before or after admixture of the water with the ethyl cellulose solution. When free alkali is present, an alternative method is to add to the water or to the emulsion, an acid such as, for example, sulphuric acid, hydrochloric acid, acetic acid, etc., sufficient in quantity to neutralize some or all of the free alkali remaining in the crude ethyl cellulose mixture, thereby forming a salt and preventing the alkali from stabilizing the emulsion. The two alternative measures may be combined. It is in general desirable that the final aqueous phase contain in excess of about 5% of salt or salts including those extracted, added, or formed as hereinabove mentioned.

It should be kept in mind in applying this invention that the preparation of the ethyl cellulose should be so regulated, and the added solvents, if any, should be so chosen, that the final ethyl cellulose solution will have a specific gravity reasonably different from that of the final water phase. Otherwise, separation is difficult. Conversely, separation is easiest when the widest difference in specific gravity exists. With these considerations in mind, a very wide range of processes can readily be adapted to the practice of this invention.

As is well known, if water is added to to a solution of ethyl cellulose dissolved in a solvent which is miscible with water, precipitation will occur. In cases where the preparation step results in ethyl cellulose dissolved in a water-miscible solvent, this condition may usually be remedied by addition of sufficient water-immiscible organic solvent to make the resulting solvent mixture substantially immiscible with water. After this addition of organic solvent is well mixed in, water may be added according to the method of this invention.

The following examples are intended to illustrate further the disclosures of this invention by specific embodiments thereof:

*Example 1*

Nine hundred fifty parts by weight of sheeted purified cotton linters were immersed in 50% sodium hydroxide for several hours and pressed to a weight of about 3,000 parts. The resulting alkali cellulose was shredded and charged into a jacketed autoclave equipped with an agitator. Six thousand two hundred fifty parts by weight of benzene, 4,600 parts by weight of ethyl chloride, and 1,700 parts by weight of solid sodium hydroxide were added. The autoclave was closed and the contents were heated to 130° C. and held at that temperature until the reaction was substantially complete, twenty hours in the autoclave being required. The autoclave was then cooled. Nine thousand parts by weight of benzene and 2,370 parts by weight of ethyl alcohol were added and stirred into the reaction product mixture. This was followed by the addition of 14,000 parts by weight of water which was thoroughly mixed with the thinned reaction product mixture.

The resulting mixture was passed through a high speed continuous centrifuge. A high density portion containing substantially all of the salt and most of the water and a low density layer containing the ethyl cellulose with a small quantity of water were obtained. The ethyl cellulose solution was mixed with fresh water and passed through a small orifice into a rapidly moving stream of mixed steam and water. The precipitated ethyl cellulose was allowed to drain, washed once with water, centrifuged to remove the water, and dried. The resulting product had a negligible salt content and gave smooth, clear solutions in the usual solvents. A portion of the reaction product mixture was precipitated by being passed through a small orifice into a rapidly moving stream of mixed steam and water without first being subjected to the method of this invention. The ethyl cellulose so precipitated required ten washes with water to reduce the salt content to a negligible quantity. Its clarity and smoothness in solution were rated "Fair" as compared with a rating of "Good" for the product obtained by the method according to this invention in this example.

*Example 2*

Nine hundred fifty parts by weight of sheeted purified cotton linters were immersed in 50% sodium hydroxide for several hours and pressed to a weight of about 3,000 parts. The resulting alkali cellulose was shredded and aged for 30 hours at 54° C. with the object of obtaining a low viscosity type of ethyl cellulose therefrom. The alkali cellulose was then charged into a jacketed autoclave equipped with an agitator. Six thousand two hundred fifty parts by weight of benzene, 4,600 parts by weight of ethyl chloride, and 1,700 parts by weight of solid sodium hydroxide were added. The autoclave was closed and the contents were heated to 130° C. and held at that temperature until the reaction was substantially complete, sixteen hours in the autoclave being required. The autoclave was then cooled. Ten thousand parts by weight of water were then added and thoroughly mixed with the reaction product mixture.

The resulting mixture was passed through a high speed continuous centrifuge. A high density portion containing substantially all of the salt and most of the water and a low density layer containing the ethyl cellulose with a small quantity of water were obtained. The ethyl cellulose solution was mixed with fresh water and passed through a small orifice into a rapidly moving stream of mixed steam and water. The precipitated ethyl cellulose was allowed to drain, washed twice with water, centrifuged to remove the water, and dried. The resulting product had a negligible salt content and gave smooth clear solutions in the usual solvents. A portion of the reaction product mixture was precipitated by being passed through a small orifice into a rapidly moving stream of mixed steam and water without first being subjected to the method of this invention. The ethyl cellulose so precipitated required ten washes with water to reduce the salt content to a negligible quantity. Its clarity and smoothness in solution were rated "fair" as compared with a rating of "good" for the product obtained by the method according to this invention in this example.

Example 3

A batch of low voscosity ethyl cellulose was prepared in the same manner as in Example 2. However, at the completion of the etherification reaction, the reaction product mixture was distilled at reduced pressure to recover the volatile by-products and excess ethyl chloride. This operation left the ethyl cellulose in coarse granules containing the non-volatile by-products of the reaction. Tests on a portion of this crude product showed that about 25 water washes would be required to remove the salt from the larger granules. The crude product was stirred into a mixture of 11,000 parts by weight of benzene and 2,360 parts by weight of ethyl alcohol. After the ethyl cellulose was dissolved, 14,000 parts by weight of water containing 5% of sodium carbonate were mixed with the solution. The resulting mixture was allowed to settle until it had separated into two phases, and the water phase was drained off. The ethyl cellulose was then precipitated by passing its solution through an orifice into a rapidly moving stream of mixed water and steam. The ethyl cellulose was allowed to drain, washed twice with water, centrifuged to remove the water and dried. The resulting product had a negligible salt content and gave smooth, clear solutions in the usual solvents.

Example 4

Nine hundred fifty parts by weight of sheeted purified cotton linters were immersed in 50% sodium hydroxide for several hours and pressed to a weight of about 3,000 parts. The resulting alkali cellulose was shredded and charged into a jacketed autoclave equipped with an agitator. Six thousand two hundred fifty parts by weight of benzene, 4,600 parts by weight of ethyl chloride, and 1,700 parts by weight of solid sodium hydroxide were added. The autoclave was closed and the contents were heated to 130° C. and held at that temperature until the reaction was substantially complete, twenty hours in the autoclave being required. The autoclave was then cooled. Nine thousand parts by weight of benzene and 2,370 parts by weight of ethyl alcohol were added and stirred into the reaction product mixture. The diluted reaction product mixture was transferred to a covered wooden tub provided with an agitator. Fourteen thousand parts by weight of water were then added and thoroughly stirred in. Sulphuric acid was slowly added with a portion of the water until the mixture tested very faintly acid. The mixture was then allowed to stand until it had separated into two layers. The ethyl cellulose solution which constituted the upper layer was then drawn off, mixed with approximately 10,000 parts by weight of water containing 5% of sodium carbonate and passed through an orifice into a rapidly moving stream of mixed water and steam. The precipitated ethyl cellulose was allowed to drain, washed twice with water, centrifuged to remove the water and dried. The resulting product had a negligible salt content and gave smooth, clear solutions in the usual solvents.

Many modifications in the application of this invention are possible. For example, a modification might be the repetition of the water addition and separation steps before final precipitation of the ethyl cellulose with the object of obtaining a super-pure product. The water-immiscible solution of a crude ethyl cellulose may be a reaction product mixture or it may be a solution of a crude ethyl cellulose which has been precipitated from its reaction mixture and redissolved. Another modification would consist of bleaching the ethyl cellulose solution preceding or following the steps of this invention. The ethyl cellulose solution may be treated with acids with the advantage that the water solubility of certain of the impurities may be increased. In fact, many of the purification steps known to the art may be combined with this invention.

The practice of this invention confers several distinct benefits. For example, a precipitated ethyl cellulose prepared by reacting cellulose, alkali, and ethyl chloride and treated according to this invention requires only about two water washes to become substantially free of salt whereas the same precipitated directly from its reaction product mass requires ten or more washes. The eight extra washes take about 16 hours, whereas the steps of diluting the ethyl cellulose reaction mixture, mixing with water, and centrifuging require about one hour. Furthermore, the removal of the salt facilitates precipitation as there is no difficulty due to clogging of the precipitating apparatus by salt crystals.

A still further advantage is unexpectedly obtained. It has been found that unreacted and partly reacted cellulose and other insoluble and semi-soluble matter which cause haze and granularity in solution are substantially removed from the ethyl cellulose solution. The more rapid the separation, the better is the removal of these materials. The effect is obtained whether water alone, or water plus a salt or an acid to prevent emulsion formation, is used. Centrifuging to separate the aqueous and ethyl cellulose phases removes more fibers and other similar insoluble bodies than does centrifuging of the ethyl cellulose solution alone. Similarly, settling the mixed phases more effectively removed these impurities than settling the ethyl cellulose solution alone. It is not clear how this result is obtained, but it seems probable that the aqueous phase carries down or flushes out the said impurities in a manner analogous to the effect of air bubbles in flotation processes. In any case, it will be seen that the method of this invention has the utility of converting a crude ethyl cellulose containing unreacted and partly reacted fibers to a high grade product cable of giving clear, substantially fiber-free solutions. It thus makes practicable the use of etherification processes in which excess of reagents and reaction time is held down, resulting in low costs but a relatively poor product.

It will be understood that the details and examples hereinbefore set forth are illustrative only, and that the invention as broadly described and claimed is in no way limited thereby.

What I claim and desire to protect by Letters Patent is:

1. A method for the purification of a crude ethyl cellulose which comprises the steps of bringing a water-immiscible solution of the crude ethyl cellulose ether into intimate contact with water, separating the resulting aqueous phase from the ethyl cellulose solution, and recovering the ethyl cellulose from its solution.

2. A method for the purification of a crude ethyl cellulose which comprises the steps of bringing a water-immiscible solution of the crude ethyl cellulose into intimate contact with water, separating by centrifugal means the resulting aqueous phase from the ethyl cellulose solution, and recovering the ethyl cellulose from its solution.

3. A method for the purification of a crude ethyl cellulose having an ethoxy content in the range from about 38% to about 54% which comprises the steps of bringing a water-immiscible solution of the crude ethyl cellulose ether into intimate contact with water, separating the resulting aqueous phase from the ethyl cellulose solution, and recovering the ethyl cellulose from its solution.

4. A method for the purification of a crude ethyl cellulose having an ethoxy content in the range from about 38% to about 54% which comprises the steps of bringing a water-immiscible solution of the crude ethyl cellulose into intimate contact with water, separating by centrifugal means the resulting aqueous phase from the ethyl cellulose solution, and recovering the ethyl cellulose from its solution.

5. A method for the purification of a crude ethyl cellulose having an ethoxy content in the range from about 38% to about 54% which comprises the steps of bringing a water-immiscible solution of the crude ethyl cellulose into intimate contact with water, adjusting the water phase so that it contains in excess of about 5% of a water soluble salt, separating the resulting water phase from the ethyl cellulose solution, and recovering the ethyl cellulose from its solution.

6. A method for the purification of a crude ethyl cellulose having an ethoxy content in the range from about 38% to about 54% which comprises the steps of bringing a water immiscible solution of the crude ethyl cellulose into intimate contact with water, adjusting the water phase so that it contains in excess of about 5% of sodium carbonate, separating the resulting water phase from the ethyl cellulose solution, and recovering the ethyl cellulose from its solution.

7. A method for the purification of a crude ethyl cellulose having an ethoxy content in the range from about 38% to about 54% which comprises the steps of bringing a water-immiscible solution of the crude ethyl cellulose into intimate contact with water, adjusting the water phase so that it contains in excess of about 5% of sodium sulphate, separating the resulting water phase from the ethyl cellulose solution, and recovering the ethyl cellulose from its solution.

8. A method for the purification of a crude ethyl cellulose having an ethoxy content in the range from about 38% to about 54% which comprises the steps of bringing a water-immiscible solution of the crude ethyl cellulose into intimate contact with water, adjusting the water phase so that it contains in excess of about 5% of a water soluble salt, separating by centrifugal means the resulting water phase from the ethyl cellulose solution, and recovering the ethyl cellulose from its solution.

9. A method for the purification of a crude ethyl cellulose having an ethoxy content in the range from about 38% to about 54% which comprises the steps of bringing a water-immiscible solution of the crude ethyl cellulose into intimate contact with water, adjusting the water phase so that it contains in excess of about 5% of sodium carbonate, separating by centrifugal means the resulting water phase from the ethyl cellulose solution, and recovering the ethyl cellulose from its solution.

HAROLD M. SPURLIN.